US010327420B2

(12) United States Patent
Diskin et al.

(10) Patent No.: US 10,327,420 B2
(45) Date of Patent: Jun. 25, 2019

(54) CAT SCRATCHER AND AMUSEMENT DEVICE

(71) Applicant: Worldwise, Inc., Novato, CA (US)

(72) Inventors: Aimee Diskin, Napa, CA (US); Lisa Davis, Fairfax, CA (US); Andy Murrer, Alamo, CA (US); Blaire Broten, San Rafael, CA (US)

(73) Assignee: Worldwise, Inc., Novato, CA (US)

( * ) Notice: Subject to any disclaimer, the term of this patent is extended or adjusted under 35 U.S.C. 154(b) by 261 days.

(21) Appl. No.: 15/596,281

(22) Filed: May 16, 2017

(65) Prior Publication Data

US 2018/0332822 A1 Nov. 22, 2018

(51) Int. Cl.
*A01K 15/02* (2006.01)

(52) U.S. Cl.
CPC .......... *A01K 15/024* (2013.01); *A01K 15/025* (2013.01)

(58) Field of Classification Search
CPC ..... A01K 15/02; A01K 15/024; A01K 15/025
USPC .......................................................... 119/706
See application file for complete search history.

(56) References Cited

U.S. PATENT DOCUMENTS

| | | | | |
|---|---|---|---|---|
| 5,269,261 A * | 12/1993 | McCance | A01K 15/025 | 119/706 |
| 2010/0006037 A1* | 1/2010 | Salzman | A01K 1/033 | 119/484 |
| 2010/0122665 A1* | 5/2010 | Delzio | A01K 15/024 | 119/706 |
| 2014/0014043 A1* | 1/2014 | McCann | A01K 15/024 | 119/706 |

* cited by examiner

*Primary Examiner* — Monica L Williams
*Assistant Examiner* — Aaron M Rodziwicz
(74) *Attorney, Agent, or Firm* — Bay Area Technology Law Group PC

(57) ABSTRACT

A cat scratcher and activity center is in the form of a rectangular box having a top, bottom and four sidewalls creating an interior space, the top being detachable and completely removable from the rectangular box. A rectangular block of corrugated cardboard is sized to fit within and occupy the interior space, the cardboard block having an open fluted surface which is exposed upon removal of the top. A planar cardboard toy kit is sized to reside within the interior space atop the open fluted surface of the rectangular block of corrugated cardboard, the planar cardboard toy kit being convertible to a three-dimensional configuration appendable to one of the four sidewalls.

8 Claims, 3 Drawing Sheets

15
22
23
21
31

CAT SCRATCHER AND AMUSEMENT DEVICE

TECHNICAL FIELD

The present invention involves a cat scratcher-based attractant and amusement device capable of encouraging a domestic cat to employ a dedicated scratching surface rather than furniture, carpets and drapes and to maintain a cat's interest for prolonged periods of time in doing so.

BACKGROUND OF THE INVENTION

It is well recognized that domestic cats crave scratching as part of their natural instinctive character. If a dedicated scratching surface is not provided, domestic cats will generally satisfy their need to scratch by turning to furniture, curtains and other articles which can be substantially damaged as a consequence. Often times, pet cats will not only climb over furniture, specifically upholstered chairs and sofas, but will use such furniture and carpeting to condition their claws through deliberate repeated clawing, pulling and tearing actions specifically with their forepaws. As noted, this clawing activity appears to be an irresistible natural impulse for cats and can be the source of great aggravation to pet owners.

There are a number of suppliers of pet and pet related products that have offered implements dedicated to alleviating the need of a cat to scratch. These include cat scratching posts and pads comprised of, for example, carpet, sisal, seagrass, rope and cardboard. In most instances, the cat scratching surface is simply made available to the cat relying upon the cat to seek it out on its own. To encourage cats to use a dedicated scratching surface, often times, a pet product manufacturer will infuse catnip or a similar attractant into the body of the scratching surface. However, being merely a passive post or pad, cats will generally get bored and engage in destructive activity which could have been avoided if an attempt was made to actively attract a cat to the scratching surface and to keep it engaged with the scratcher by playing upon the cat's natural curiosity to seek out and swat objects as they would prey.

In addition to a cat's need to scratch, domestic cats also require stimulation. Without it, they get bored which could result in health problems and associated unwelcome antisocial behavior. It is also well known to anyone owning a pet cat that they possess a natural instinct to swat, pounce and attack moving attractants and can almost be mesmerized by them for long periods of time.

Another drawback to the use of current scratchers and associated attractants is that they tend to be bulky and not conducive to low-cost shipping options. This is particularly significant as manufacturing has shifted to remote locations where labor costs are less than those in this country. Shipping costs have become an increasingly more significant factor in establishing product pricing particularly as it pertains to non-technical, relatively low end products which rely upon various unskilled labor intensive operations.

Typically, manufactured goods produced in Asia are imported into the United States on commercial vessels. These goods are not only manufactured but packaged at Asian factories and multiple units placed within cardboard containers or otherwise bundled in groups for placement within shipping containers which are, in turn, stacked atop appropriately configured vessels. The shipping cost per item is dictated by the number of such items which can be placed within said shipping containers as the cost per transoceanic passage substantially remains fixed.

Certain items, such as televisions, stereos, computers and semiconductor chips are configured with hard outer casings and there is little the shipper can do to reduce shipping cost. This is equally true for scratchers in the form of posts, furniture and the like as well as for cat attractant toys which do not generally lend themselves to efficient, boxed shipping containers.

Further adding to the cost of such goods is where such products cannot be efficiently packaged for warehouse stacking and retail shelving. Products manufactured offshore are first send to a warehousing facility for distribution to regional retail outlets. Relatively inexpensive goods occupy the same physical space as more expensive items received and subsequently displayed for consumer purchasing contributing unduly to their cost and ultimate retail pricing.

It is thus an object of the present invention to provide an effective cat scratcher and amusement device which can be efficiently packaged for shipment, storage and sale much more efficiently than similar products currently available.

It is yet a further object to the present invention to provide a combination cat scratcher and amusement device which is relatively inexpensive to produce, easily assembled by a consumer and which is effective in reducing destructive scratching of upholstered furniture, carpets, drapes and the like.

These and further objects will be more readily apparent when considering the following disclosure and appended claims.

SUMMARY OF THE INVENTION

A cat scratcher and activity center comprising:

a substantially rectangular box having a top, bottom and four sidewalls creating an interior space;

said top being detachable and completely removable from said substantially rectangular box;

a substantially rectangular block of corrugated cardboard sized to fit within and occupy said interior space, said cardboard block having an open fluted surface which is exposed upon removal of said top;

a substantially planar cardboard toy kit sized to reside within said interior space atop said open fluted surface of said substantially rectangular block of corrugated cardboard;

said substantially planar cardboard toy kit being convertible to a three-dimensional configuration appendable to one of said four sidewalls.

A method of assembling a cat scratcher and activity center comprising:

providing a substantially rectangular box having a top, bottom and four sidewalls creating an interior space;

providing a substantially rectangular block of corrugated cardboard sized to fit within and occupy said interior space;

removing said top from said four sidewalls exposing an open fluted surface of said cardboard block;

providing a substantially planar cardboard toy kit sized to reside within said interior space atop said substantially rectangular open fluted cardboard block, said planar cardboard toy kit having score lines to facilitate folding there along and at least one perforation for defining a cardboard section removable from said planar cardboard toy kit;

removing said planar cardboard toy kit from said interior space;

folding said planar cardboard toy kit along said score lines and removing said cardboard section therefrom to create a three-dimensional configuration with an exposed opening;

inserting said cardboard section within said three-dimensional configuration for exposing said cardboard section to a cat using said cat scratcher and activity center; and joining said three-dimensional toy kit to one of said sidewalls.

DETAILED DESCRIPTION OF THE INVENTION

Figure 1:
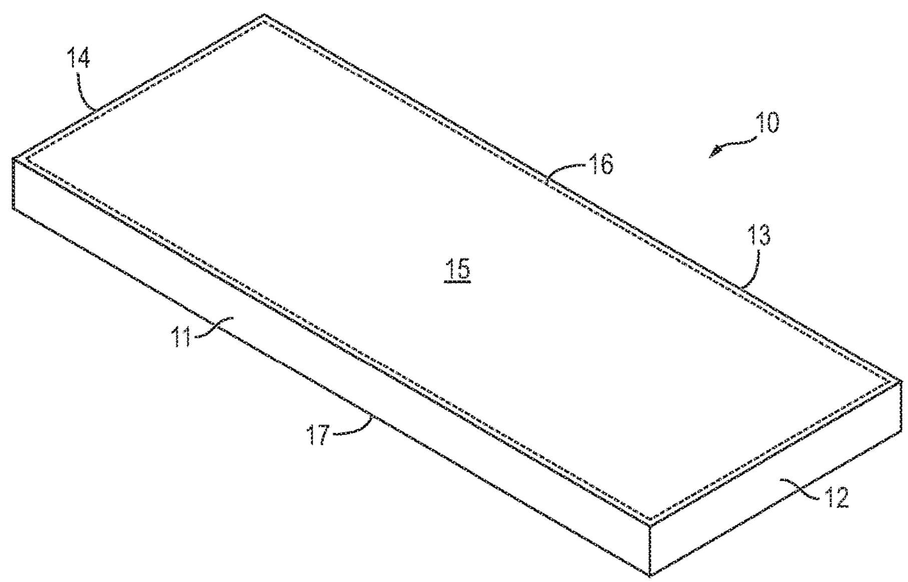
FIG. 1 is a perspective view of box-like container housing the present cat scratcher and activity center.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In turning first to FIG. 1, the cat scratcher and activity center is completely housed within substantially rectangular box 10 ideally composed of cardboard and having a compact form factor as a substantially rectangular box having top 15, bottom 17 and four sidewalls 11, 12, 13 and 14. Although essentially rectangular box 10 can be efficiently shipped, stacked, stored and shelved, it contains all of the components necessary to create an extremely effective cat scratcher and activity center.

Figure 2:
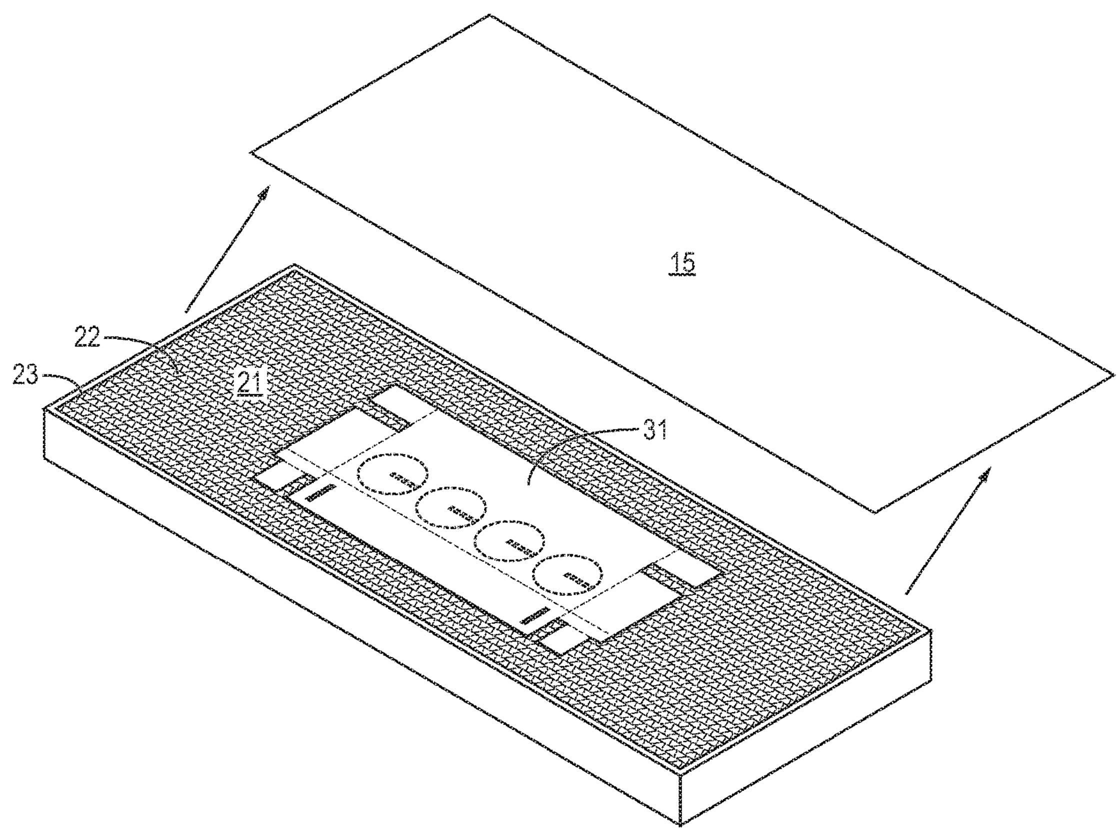
FIG. 2 is a perspective view of the box-like container of FIG. 1 illustrating the removal of its top and revealing its internal components.

As noted in FIG. 2, top 15 can be completely detached from substantially rectangular box 10 by separating top 15 from sidewalls 11, 12, 13 and 14 along perforated edge 16. Once removed, top 15 can be discarded. Upon doing so, the pet owner has before him cardboard block 21 sized to reside within and occupy interior space 23 having open fluted surface 22 which is exposed upon removal of top 15. Substantially planar cardboard toy kit 31 lays flat against open fluted surface 22 during shipping, storing and shelving of essentially rectangular box 10 in fulfilling one of the goals of the present invention to create a suitable form factor as discussed previously.

Substantially planar cardboard toy kit is convertible to a three-dimensional configuration appendable to one of the four sidewalls of rectangular box 10 while creating cat attractant toys there from.

Figure 3:
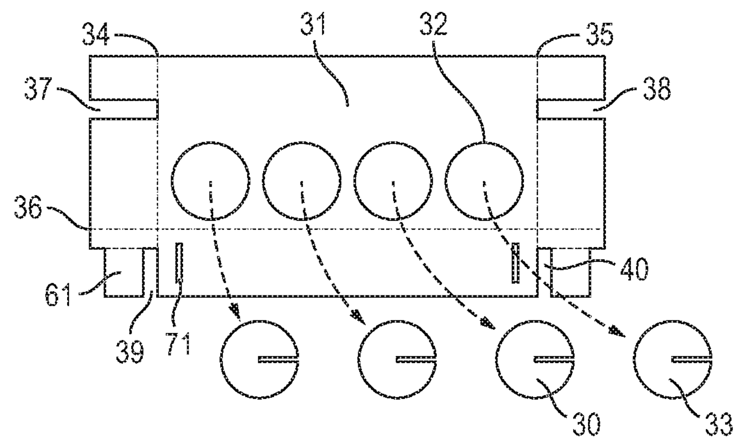
FIG. 3 is a plan view of the planar cardboard toy kit located within the box-like container of FIG. 1 prior to assembly.

In turning first to FIG. 3, substantially planar cardboard toy kit 31 is shown whereby at least one perforation 32 is shown creating cardboard section 33 removable from substantially planar cardboard toy kit 31. In this illustration, four such perforations are depicted resulting in the removal of four such cardboard sections. Ideally, perforation 32 is substantially circular resulting in cardboard section 33 also being substantially circular as are the other removed cardboard sections depicted in this drawing.

Figure 4A:
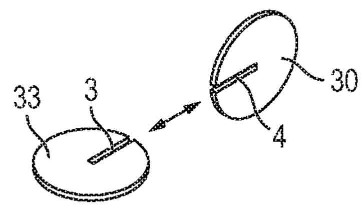
FIGS. 4A and 4B illustrate the assembly of cardboard sections taken from the planar toy kit of FIG. 3 being assembled for use herein.
Figure 4B:
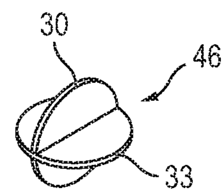

As noted in reference to FIGS. 4A and 4B, substantially circular cardboard sections 30 and 33 are configured with radial slots 3 and 4 enabling substantially circular cardboard sections 30 and 33 to be joined as shown resulting in pet attractant toy 46. In the example depicted in FIG. 3, two such that attractant toys would be created from the four cardboard sections removed from the substantially planar toy kit 31. Openings 44 resulting from the removal of the cardboard sections are sized to enable a cat to extend its paw within the three-dimensional configuration to enable a cat to swat at cat attractant toys 46 as will be more fully described below.

Figure 5:
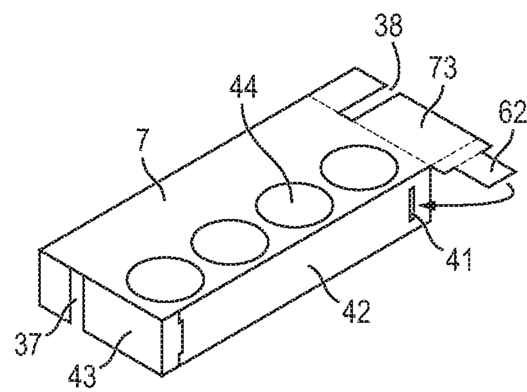
FIG. 5 illustrates the toy kit of FIG. 3 being converted to a three-dimensional configuration for use herein.
Figure 6:
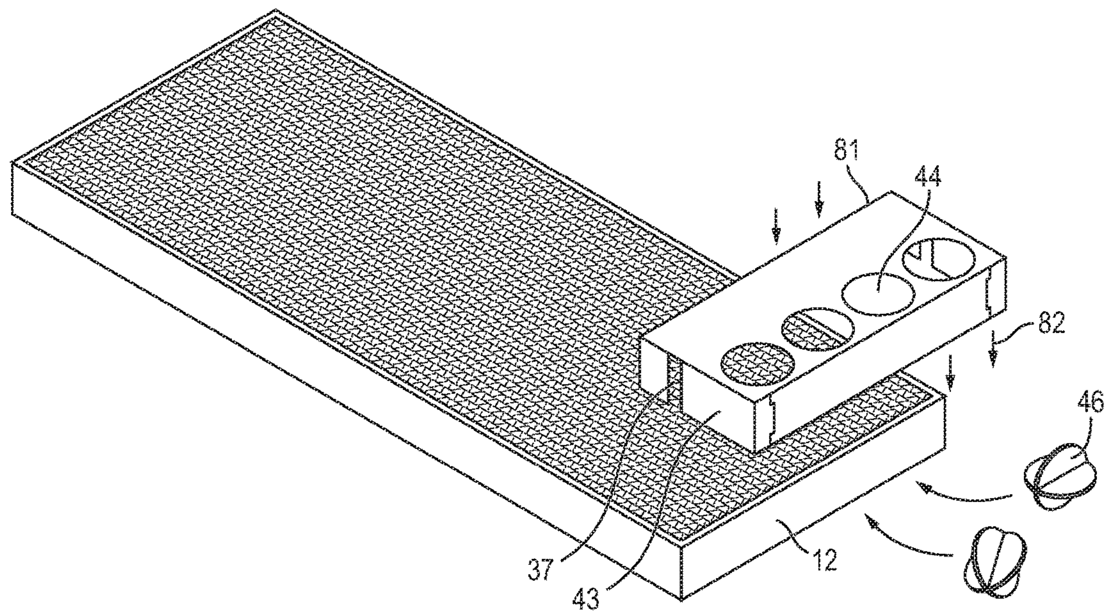
FIG. 6 is a perspective view illustrating the assembly of the cat scratcher and activity center of the present invention.
Figure 7:
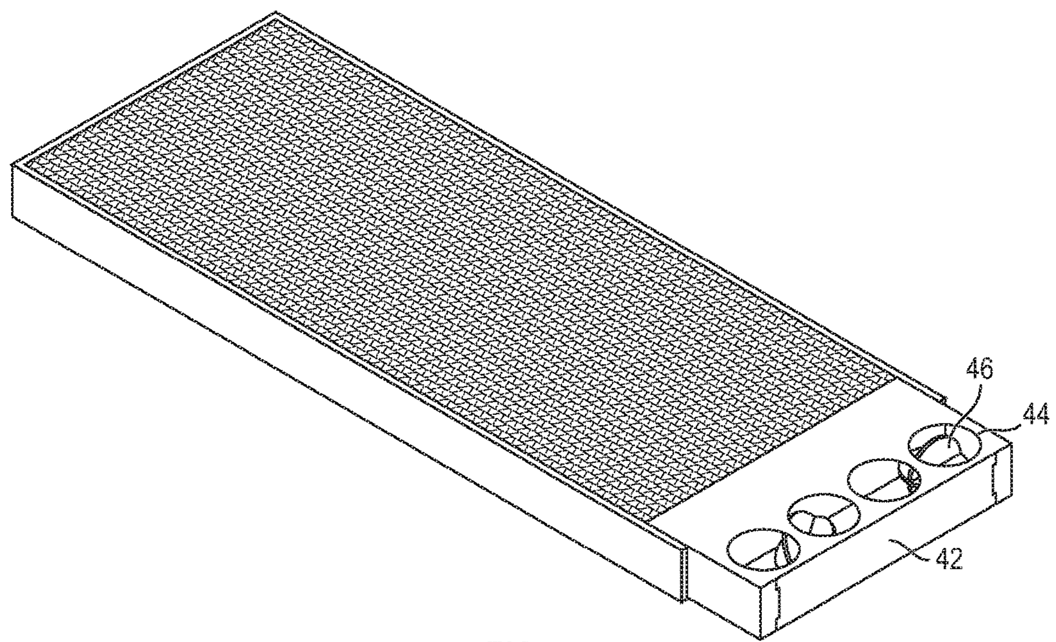
FIG. 7 is a perspective view of the cat scratcher and activity center of the present invention being fully assembled and awaiting use by a pet cat.

It is first noted that substantially planar cardboard toy kit 31 is provided with slots 37, 38, 39 and 40 as well as score lines 34, 35 and 36 which facilitate the folding of various subparts thereof to create the three-dimensional configuration as depicted in FIG. 5. As noted, subpart 42 folds along score lines 36 to be oriented substantially perpendicularly with respect to top surface 7. Tabs 61 and 62 are sized to fit within slots 41 and 71 such that side panels 43 and 73 are oriented substantially perpendicularly to top surface 7 creating the three-dimensional box-like structure best shown in FIG. 6.

Once fabricated, three-dimensional box-like structure 81 is joined to substantially rectangular box 10 by side wall 12 fitting within slots 37 and 38. Prior to fitting three-dimensional box-like structure 81 to substantially rectangular box 10 in the direction of arrows 82, pet attractant toys 46 are captured by three-dimensional box-like structure 81 such that they remain visible through opening 44 which, as noted previously, are sized to enable a cat to extend its paw there through to swat at cat attractant toys 46 as a stimulant, to reduce boredom and to encourage a cat to use the scratcher as intended.

In summary, what is herein provided is a cat scratcher having a highly effective cardboard open fluted scratching surface and pet toy to encourage use of the scratcher and to minimize boredom all housed in an extremely compact rectangularly-shaped container which is ideal for its shipping, storing, stacking and displaying. If the pet owner wishes to do so, pet attractant toys 46 can be replaced by other attractants such as feathered bundles, squeaking toys and the like to further stimulate the pet. Furthermore, substantially rectangular corrugated cardboard block 21 can be removed from substantially rectangular box 10 and turned upside down to present a fresh scratching surface as needed. As such, the present invention provides a relatively inexpensive yet effective cat scratcher and activity center which is not only relatively inexpensive to produce and ship but also occupies minimal space at the pet owner's residence. When not in use, the present cat scratcher and activity center could be, for example, simply slid under one's bed or placed upon a shelf as desired.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat scratcher and activity center comprising:
- a substantially rectangular box having a top, bottom and four sidewalls creating an interior space;
- said top being detachable and completely removable from said substantially rectangular box;
- a substantially rectangular block of corrugated cardboard sized to fit within and occupy said interior space, said cardboard block having an open fluted surface which is exposed upon removal of said top;
- a substantially planar cardboard toy kit sized to reside within said interior space atop said open fluted surface of said substantially rectangular block of corrugated cardboard;
- said substantially planar cardboard toy kit being convertible to a three-dimensional configuration appendable to one of said four sidewalls.

2. The cat scratcher and activity center of claim 1 wherein said substantially planar cardboard toy kit comprises at least one perforation creating a cardboard section, said cardboard section being removable from said substantially planar cardboard toy kit.

3. The cat scratcher and activity center of claim 2 wherein said cardboard section defined by said at least one perforation is substantially circular and upon being removed from said substantially planar cardboard section creates a cat attractant toy sized to reside within said three-dimensional configuration.

4. The cat scratcher and activity center of claim 3 wherein an opening created upon the removal of said cardboard section is of a size to enable a cat to extend its paw within said three-dimensional configuration to enable a cat to swat at said cat attractant toy.

5. The cat scratcher and activity center of claim 3 wherein said substantially planar cardboard toy kit comprises at least two substantially circular perforations for removal of at least two cardboard sections, said cardboard sections being joinable to one another to create said cat attractant toy.

6. A method of assembling a cat scratcher and activity center comprising:
- providing a substantially rectangular box having a top, bottom and four sidewalls creating an interior space;
- providing a substantially rectangular block of corrugated cardboard sized to fit within and occupy said interior space;
- removing said top from said four sidewalls exposing an open fluted surface of said cardboard block;
- providing a substantially planar cardboard toy kit sized to reside within said interior space atop said substantially rectangular open fluted cardboard block, said planar cardboard toy kit having score lines to facilitate folding there along and at least one perforation for defining a cardboard section removable from said planar cardboard toy kit;
- removing said planar cardboard toy kit from said interior space;
- folding said planar cardboard toy kit along said score lines and removing said cardboard section therefrom to create a three-dimensional configuration with an exposed opening;
- inserting said cardboard section within said three-dimensional configuration for exposing said cardboard section to a cat using said cat scratcher and activity center; and
- joining said three-dimensional toy kit to one of said sidewalls.

7. The method of assembling the cat scratcher and activity center of claim 6 wherein said substantially planar cardboard toy kit comprises at least two substantially circular perforations each defining a cardboard section and removing each cardboard section therefrom.

8. The method of assembling the cat scratcher and activity center of claim 7 wherein said cardboard sections are joined to one another to create said cat attractant toy.

* * * * *